US007283659B1

(12) United States Patent
Bakker et al.

(10) Patent No.: US 7,283,659 B1
(45) Date of Patent: Oct. 16, 2007

(54) APPARATUS AND METHODS FOR SEARCHING THROUGH AND ANALYZING DEFECT IMAGES AND WAFER MAPS

(75) Inventors: David R. Bakker, Cupertino, CA (US); Prashant A. Aji, San Jose, CA (US); James L. Belliveau, Los Gatos, CA (US); Chacko C. Neroth, Sunnyvale, CA (US)

(73) Assignee: KLA-Tencor Technologies Corporation, Milpitas, CA (US)

( * ) Notice: Subject to any disclaimer, the term of this patent is extended or adjusted under 35 U.S.C. 154(b) by 620 days.

(21) Appl. No.: 10/175,229

(22) Filed: Jun. 18, 2002

Related U.S. Application Data

(60) Provisional application No. 60/348,078, filed on Jan. 9, 2002.

(51) Int. Cl.
*G06K 9/00* (2006.01)
(52) U.S. Cl. .................. 382/149; 382/144; 382/145
(58) Field of Classification Search ............. 382/144, 382/145, 149
See application file for complete search history.

(56) References Cited

U.S. PATENT DOCUMENTS 4,441,205 A    4/1984  Berkin et al. ............... 382/151

(Continued)

FOREIGN PATENT DOCUMENTS

WO        01/40145 A2    7/2001

OTHER PUBLICATIONS

Fan, Y.-H.; Moalem, Y., "Effective defect detection and classification methodology based on integrated laser scanning inspection and automatic defect classification", Proc. IEEE Conference on Advanced Semiconductor Manufacturing, 1998, pp. 266-271□□.*

(Continued)

*Primary Examiner*—Matthew C. Bella
*Assistant Examiner*—Utpal Shah
(74) *Attorney, Agent, or Firm*—Beyer Weaver LLP

(57) ABSTRACT

Disclosed are methods and apparatus for automatically organizing and/or analyzing a plurality of defect images without first providing a predefined set of classified images (herein referred to as a training set). In other words, sorting is not based on a training set or predefined classification codes for such defect images. In one embodiment, the defect images each include associated identifying data, such as a fabrication identifier, lot number, wafer number, and layer identifier. Initially, the defect images are sorted according to at least a portion of the associated identifying data into a plurality of "identifying data groups" or image families. The defect data in each identifying data group is then automatically sorted according to defect appearance. That is, similar defect images are associated with a single bin and similar bins are associated with other similar bins. For example, similar bins are arranged next to each other within a graphical user interface (GUI). A representative feature vector (herein referred to as a "centroid") is then associated with each bin. The centroid generally represents the images within the particular bin. A search for images that "look like" a specified target image may then be efficiently performed on a particular identifying data group using the centroids of each bin. The target image's feature vector is compared with the centroid of each bin that is within the same identifying data group or image family as the target image. The techniques of the present invention may also be applied to wafer maps, as well as defect images.

41 Claims, 11 Drawing Sheets

U.S. PATENT DOCUMENTS

| | | | |
|---|---|---|---|
| 5,093,867 A | 3/1992 | Hori et al. | 382/141 |
| 5,121,439 A | 6/1992 | Fukuda et al. | 382/141 |
| 5,353,356 A | 10/1994 | Waugh et al. | 382/143 |
| 5,529,437 A | 6/1996 | Filipowski | 382/141 |
| 5,537,670 A | 7/1996 | Cox et al. | 382/219 |
| 5,544,256 A * | 8/1996 | Brecher et al. | 382/149 |
| 5,598,341 A | 1/1997 | Ling et al. | 364/468.17 |
| 5,638,465 A * | 6/1997 | Sano et al. | 382/281 |
| 5,761,064 A | 6/1998 | La et al. | 364/468 |
| 5,841,893 A * | 11/1998 | Ishikawa et al. | 382/145 |
| 5,862,055 A * | 1/1999 | Chen et al. | 700/121 |
| 5,893,095 A * | 4/1999 | Jain et al. | 707/6 |
| 5,911,139 A | 6/1999 | Jain et al. | 707/3 |
| 5,913,205 A | 6/1999 | Jain et al. | 707/2 |
| 5,999,003 A * | 12/1999 | Steffan et al. | 324/537 |
| 6,092,059 A * | 7/2000 | Straforini et al. | 706/14 |
| 6,097,887 A | 8/2000 | Hardikar et al. | 717/105 |
| 6,104,835 A * | 8/2000 | Han | 382/225 |
| 6,148,099 A * | 11/2000 | Lee et al. | 382/149 |
| 6,177,287 B1 * | 1/2001 | Steffan et al. | 438/14 |
| 6,185,322 B1 * | 2/2001 | Ishikawa et al. | 382/141 |
| 6,233,719 B1 | 5/2001 | Hardikar et al. | 716/1 |
| 6,292,582 B1 | 9/2001 | Lin et al. | 382/149 |
| 6,480,627 B1 | 11/2002 | Mathias et al. | 382/224 |
| 6,542,830 B1 * | 4/2003 | Mizuno et al. | 702/35 |
| 6,687,397 B2 | 2/2004 | DeYong et al. | 382/145 |
| 6,751,343 B1 * | 6/2004 | Ferrell et al. | 382/145 |
| 6,922,482 B1 * | 7/2005 | Ben-Porath | 382/149 |
| 6,987,873 B1 * | 1/2006 | Ben-Porath et al. | 382/145 |

OTHER PUBLICATIONS

Bakker et al, U.S. Appl. No. 09/724,633, entitled "Power Assisted Automatic Supervised Classifier Creation Tool for Semiconductor", filed Nov. 28, 2000. *Copies of allowed claims attached.

U.S. Office Action dated Mar. 24, 2004, from related U.S. Appl. No. 09/724,633.

U.S. Office Action dated May 3, 2005, from related U.S. Appl. No. 09/724,633.

* cited by examiner

FIG. 5C

APPARATUS AND METHODS FOR SEARCHING THROUGH AND ANALYZING DEFECT IMAGES AND WAFER MAPS

CROSS REFERENCE TO RELATED PATENT APPLICATION

This application takes priority under U.S.C. 119(e) of U.S. Provisional Application No. 60/348,078 filed on Jan. 9, 2002 entitled Apparatus and Methods for Searching Through and Analyzing Defect Images and Wafer Maps," by David R. Bakker, Prashant A. Aji, James L. Belliveau and Chacko C. Neroth, Ph.D, which is incorporated by reference in its entirety for all purposes.

BACKGROUND OF THE INVENTION

The present invention relates generally to techniques for organizing images of defects found on integrated circuit devices. Additionally, it relates to techniques for searching through such defect images for one or more images that have a similar appearance to a target defect image and analyzing the found images to help determine a cause of the target defect.

Semiconductor defects may include structural flaws, residual process material and other surface contamination which occur during the production of semiconductor wafers. Defects are typically detected by a class of instruments called inspection tools. Such instruments automatically scan wafer surfaces and detect, and record the location of optical anomalies using a variety of techniques. This information, or "defect map," is stored in a computer file and sent to a defect review station.

Using the defect map to locate each defect, a human operator observes each defect under a microscope and classifies each defect according to class (e.g., particle, pit, scratch, or contaminant). Information gained from this process is used to correct the source of defects, and thereby improve the efficiency and yield of the semiconductor production process. Problems with this classification method include the technician's subjectivity in identifying the defect class, and the fatigue associated with the highly repetitive task of observing and classifying these defects.

Methods of automatically classifying defects, collectively known as Automatic Defect Classification or "ADC," have been developed to overcome the disadvantages of manual defect classification. In conventional ADC, review stations are automated to load a wafer that has been mapped for defect location by a defect scanner. Once the mapped wafer is loaded, the review station:

1. positions the wafer to image the site of a defect, as indicated by the defect map;
2. focuses on the site of the defect;
3. captures a digital image of the site;
4. processes and analyzes the captured image of the site to locate the defect within the image; and
5. further analyzes the data to classify the defect.

The above process is repeated for each defect (or a predetermined subset of defects) on the wafer. The wafer is then unloaded and the process is repeated for another wafer. By eliminating a fatiguing and highly repetitive task, such automated review stations reduce labor costs and provide improved consistency and accuracy over human operators.

Accordingly, an ADC system uses image processing techniques to first detect the defect and then to classify the defect according to the defect's physical characteristics and background geometry. Comparing these physical characteristics to the physical characteristics of pre-classified defects in a knowledge database (KDB) permits automated defect classification. While this system reduces technician fatigue and increases the number of defects that can be classified per unit time, there is presently a problem with such KDB programs providing an accurate classification.

Generating a KDB for classifying objects typically utilizes direct coding methods, whereby an operator subjectively selects what are thought to be typical defects and enters the defect images and predetermined classification codes into a detection system to generate a knowledge database that is later used by an ADC system for classifying unknown defects.

A knowledge database generated by this method is subject to inaccuracy since human variability, introduced in the initial subjective identification of the defect type, is included in the KDB. Moreover, present database generating methods, including direct coding, are time consuming and require a significant amount of highly trained, manpower resources.

Once the defect images are classified, a search may be performed on the defect images of a particular class to look for one or more images which have been previously assigned to the same class. However, if the underlying classes are inaccurately defined, the search will produce inaccurate results. The search will also not be able to locate defects which have not been previously classified. For example, images that should be classified in the class which is searched may be left out of the search. A conventional image search typically includes comparing the target image to each image within the same class as the target image. Since each class may have thousands of defect images, this search can take a significant amount of time.

Accordingly, there is a need for improved mechanisms for organizing defect images, searching through such images, and/or analyzing the results from such a search.

SUMMARY OF THE INVENTION

Accordingly, mechanisms are provided for automatically organizing and/or analyzing a plurality of defect images without first providing a predefined set of classified images (herein referred to as a training set). In other words, sorting is not based on a training set or predefined classification codes for such defect images. In one embodiment, the defect images each include associated identifying data, such as a fabrication identifier, lot number, wafer number, and layer identifier. Initially, the defect images are sorted according to at least a portion of the associated identifying data into a plurality of "identifying data groups" or image families. The defect data in each identifying data group is then automatically sorted according to defect appearance. That is, similar defect images are associated with a single bin and similar bins are associated with other similar bins. For example, similar bins are arranged next to each other within a graphical user interface (GUI). A representative feature vector (herein referred to as a "centroid") is then associated with each bin. The centroid generally represents the images within the particular bin. A search for images that "look like" a specified target image may then be efficiently performed on a particular identifying data group using the centroids of each bin. The target image's feature vector is compared with the centroid of each bin that is within the same identifying data group or image family as the target image. The techniques of the present invention may also be applied to wafer maps, as well as defect images.

In one embodiment, a method of organizing and/or analyzing a plurality of defect images having associated identifying data is disclosed. The defect images are automatically sorted into a plurality of identifying data groups based on at least a portion of the associated identifying data. A feature vector is associated with each defect image. The defect images of each identifying data group are automatically sorted into a plurality of bins based on the associated feature vectors. The sorting of the defect images into bins is performed without using a plurality of classification definitions for each bin.

In a further aspect, the classification definitions are in the form of a plurality of pre-classified defect images. In another aspect, the defect images are sorted into bins in a single operation without any additional presorting operation based on appearance being performed on the defect images. In a specific implementation, a growth rate for each bin is monitored. When a particular bin has a growth rate that is significantly higher than the other bins, an alarm that indicates that the particular bin has a significantly higher growth rate is triggered.

In a further implementation, a centroid is associated with each bin. The centroid representing the feature vectors of the defect images within the each bin. In one aspect, ach centroid of each bin represents an average or mean of all feature vectors within the each bin. In yet another embodiment, one or more defect images which have a same appearance as a target defect image are found. The one or more defect images which have a same appearance as a target image and their associated identifying data are analyzed to determine a cause of the target defect image. In a specific implementation, the one or more defect images which have a same appearance as a target defect image are found by finding one or more centroids which most closely match the target defect image's feature vector. The one or more defect images which have a same appearance as a target defect image are from the bins which have an associated centroid which most closely matches the target defect image's feature vector.

In one aspect, the identifying data may include one or more of the following: a lot identifier, a wafer identifier, a device identifier, one or more process equipment identifiers, one or more operating parameters for each of the one or more identified process equipment, one or more operator identifiers for each of the one or more identified process equipment, identification of where each of the one or more identified process equipment are in their maintenance cycle, and a fabrication facility identifier. In one application of the present invention, a cause of the target defect image is determined by correlating the identifying data associated with the one or more defect images which have a same appearance as the target defect image. In another application, the identifying data includes yield information and it is determined how the target defect image affects yield by analyzing the yield information associated with the one or more defect images which have a same appearance as the target defect image. In yet another application, a setup of an inspection or review tool that was used to acquire the one or more defect images which have a same appearance as the target defect image is adjusted when a number of the one or more defect images which have a same appearance as the target defect image is not within a predetermined range. The adjustment is selected so that the number of defect images having a same appearance as the target defect image is altered to be within the predetermined range.

In another aspect, the invention pertains to a computer system operable to organize and/or analyze a plurality of defect images having associated identifying data. The computer system includes one or more processors and one or more memory. In yet another aspect, the invention pertains to a computer program product for organizing and/or analyzing a plurality of defect images having associated identifying data. The computer program product includes at least one computer readable medium and computer program instructions stored within the at least one computer readable product configured to cause a combining device to perform one or more of the above described inventive procedures.

These and other features and advantages of the present invention will be presented in more detail in the following specification of the invention and the accompanying figures which illustrate by way of example the principles of the invention.

BRIEF DESCRIPTION OF THE DRAWINGS

FIGS. 5A through 5C show screenshots of differently sized bin arrangements in accordance with one embodiment of the present invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
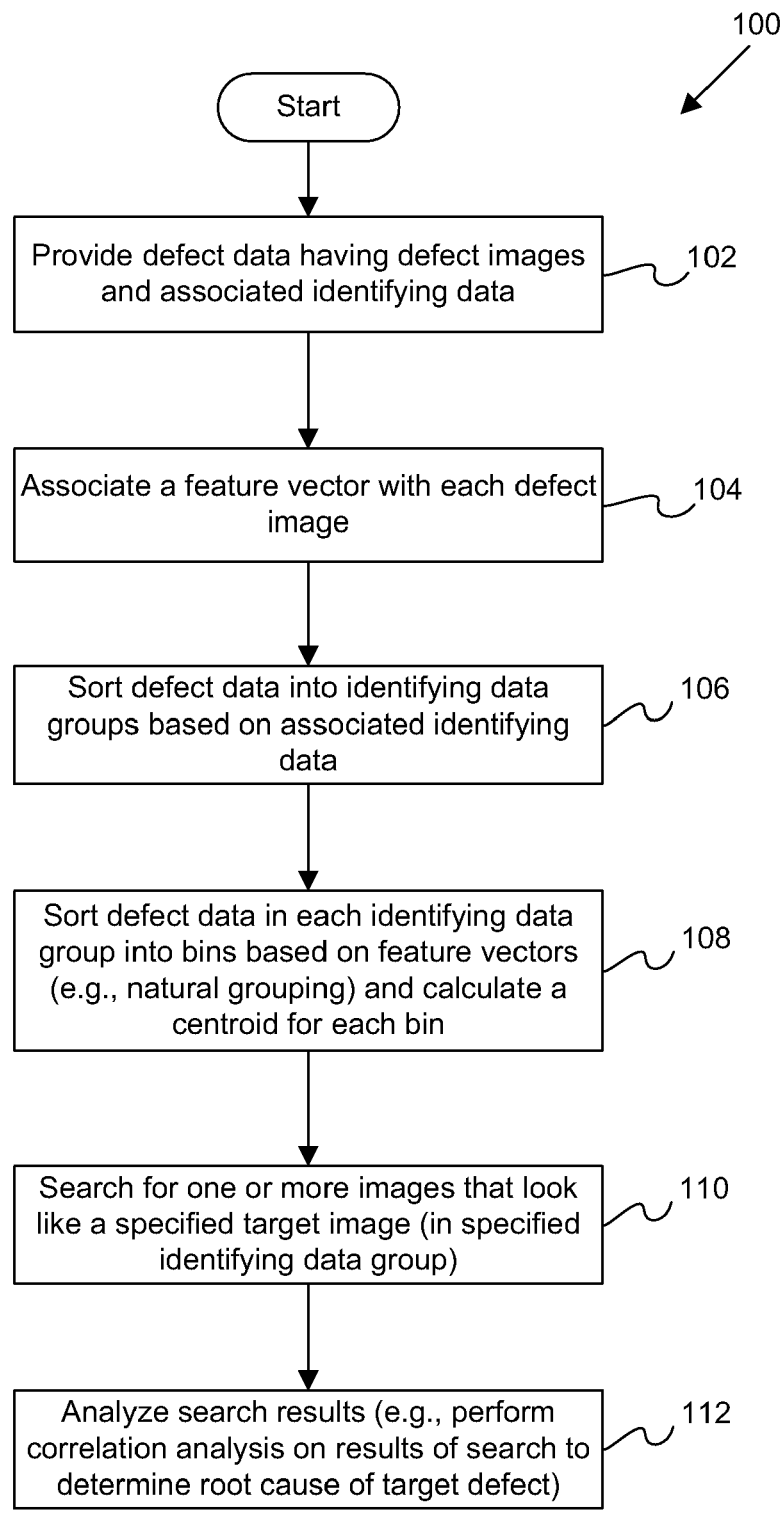
FIG. 1 is a flowchart illustrating a procedure for analyzing defects in accordance with one embodiment of the present invention.

FIG. 1 is a flowchart illustrating a procedure 100 for analyzing defects in accordance with one embodiment of the present invention. Initially, defect data having defect images and associated identifying data is provided in operation 102. In general terms, samples are inspected for defects. The defect may originate from any source. For example, the source of the defects may include problems with one or more processing tool(s) and an outside contaminate.

The identifying data may include any information that may be relevant for aiding in analyzing the defect data (e.g., determining the cause of the defect) and/or for sorting the defect images to facilitate searches through such defect data and analysis of such data. For example, the identifying data may specify the sample itself and the processing tools through which the sample has passed. In one implementation, the identifying data includes a lot identifier, a wafer identifier, a device identifier, one or more process equipment identifiers, one or more operating parameters for each of the one or more identified process equipment, one or more operator identifiers for each of the one or more identified process equipment, identification of where each of the one or more identified process equipment are in their maintenance cycle (e.g., its been 3 weeks since last cleaning of an identified processing tool), a time and date stamp, and a fabrication facility identifier. The identifying data may also specify the process type (e.g., a 0.35 µm process or a 0.25 µm process), layer (e.g., metal or oxide layer), and/or layer level (e.g., metal1, metal2, or metal3). Other identifying data pertaining to a defect may have been developed a priori, including the aforementioned as well as compositional or electrical information derived from analytical techniques and/or yield information.

Any suitable tool and/or technique may be utilized for capturing an image of a defect. Any suitable inspection tool and/or review tool may be utilized. By way of examples, an optical inspection tool, such as a darkfied laser, a brightfield, or a confocal imaging tool, or a scanning electron microscope (SEM) may be used.

The defects that are found with an inspection tool are preferably sampled to reduce the number of defects. Any suitable criteria may be used for sampling or filtering defects. For example, one may grab only relevant defects, e.g., the largest sized defects or representative defects. Sampling requires less time for capturing images of the defects since the number of defects are reduced. Additionally, less time is required for a subsequent search through such captured defect images.

The defects which are found and/or sampled are then grabbed with any suitable imaging technique. By way of examples, any suitable optical imaging technique may be used, such as darkfield imaging or confocal imaging. Additionally, conventional imaging of the top surface or multi perspective imaging may be used. Voltage contrasting imaging may also be employed. Although the techniques of the present invention are described as being applied to defect images, these techniques may also be applied to other types of images. For instance, the techniques may be applied to wafer maps, where each wafer map represents a wafer and the location of defects thereon.

A feature vector is then associated with each defect image in operation 104. In general terms, the defect pixels of each defect image are isolated by comparing a defect image with one or more reference image(s). A feature extraction technique is performed on each isolated defect image so that the defect image is translated into a plurality of descriptor values or a feature vector. The descriptor values are normalized between 0 and 1. Any suitable number and type of descriptors may be used to describe the image. The descriptors may include size, brightness, shape, texture, moment of inertia, context, proximity of defect to wafer features or other defects, connectivity to adjacent features or other defects, etc. In one implementation, 80 descriptor values are used for the feature vector. Several suitable techniques for forming a feature vector from a defect image are described in U.S. Pat. No. 6,104,835, issued 15 Aug. 2000, by Ke Han, which patent is herein incorporated by reference in its entirety. The defect images are than saved along with the feature extraction information or feature vector. For example, a file may includes a reference to each defect image and its associated feature vector.

The defect data is then sorted into identifying data groups based on at least a subset of the associated identifying data in operation 106. The defect data may be organized based on any categories of identifying data. Organization is preferably configurable by the user to optimize a search through such defect data. A specific implementation is described further below with reference to FIG. 2. The defect data of each identifying data group is then sorted into bins based on the appearance of the defect data and a centroid is then calculated for each bin in operation 108. That is, the defect images for each identifying group are sorted into bins, where the defect images in each bin resemble one another. Any suitable statistical grouping algorithm may be used. For example, a natural grouping algorithm is used as described further with reference to FIGS. 3 through 6. In this embodiment, natural grouping is automatically performed on the feature vectors of each defect image within each particular identifying data group. The images are pre-organized or clustered based on their appearance.

The centroid of each particular bin represents the feature vectors for the particular bin. In one implementation, each centroid is a vector that equals the average or mean of all feature vectors within a particular bin. That is, each point in a centroid vector is the average or mean of the same points in each defect's feature vector. Alternatively, each centroid is the defect feature vector that is the most average or the mean of the feature vectors of a particular bin.

After the defect images are sorted, a search is then performed for one or more images that look like a specified target image in operation 110. The search is performed on the defect images within the identifying data group to which the specified target image belongs. The search is based on the centroids of each bin within such identifying data group. That is, the feature vector of the target image is compared to each centroid of each bin within the particular identifying group. Since the search is only performed on a small subset of defect images (e.g., within a single identifying group and the search is based only on the centroid from each bin), the search time is significantly reduced as compared to performing a search on all defect images.

The search results in one or more defect images which most closely resemble the target image. The search results are then analyzed for any suitable purpose in operation 112. For example, a correlation analysis is performed on the results of the search to determine a root cause of the target defect.

The sorting operations (i.e., 106 and 108) and subsequent searches are performed on the defect images without using a training set of pre-classified images. That is, a user or automatic defect classifier program does not classify images to compile a training set that is then used for subsequent automatic sorting operations. Conventionally, a classification code would be assigned to a training set. New defect images would then be sorted based on such training set. Prior to performing a search for a target image, the target image would be assigned a class code and then a query would be performed based on the assigned class of the target image. In conventional systems, classification is fixed. In the present invention, classification or grouping of defect data is not fixed. That is, sorting is not based on predefined classification codes. Each bin or group is fluid and changeable. That is, as the defect data changes, new groups may be generated and old groups may be altered. In one implementation, the sorting operations (e.g., 106 and 108) are automatically performed each time a new defect image is grabbed without using a training set. Alternatively, the sorting may be performed periodically or after or prior to any suitable event, such as prior to performing a search without using a training set. In either case, the defect images are sorted into bins or groups based on their appearance and likeness to one another (e.g., the feature vectors) and not based on predefined classifications or groups.

Figure 2:
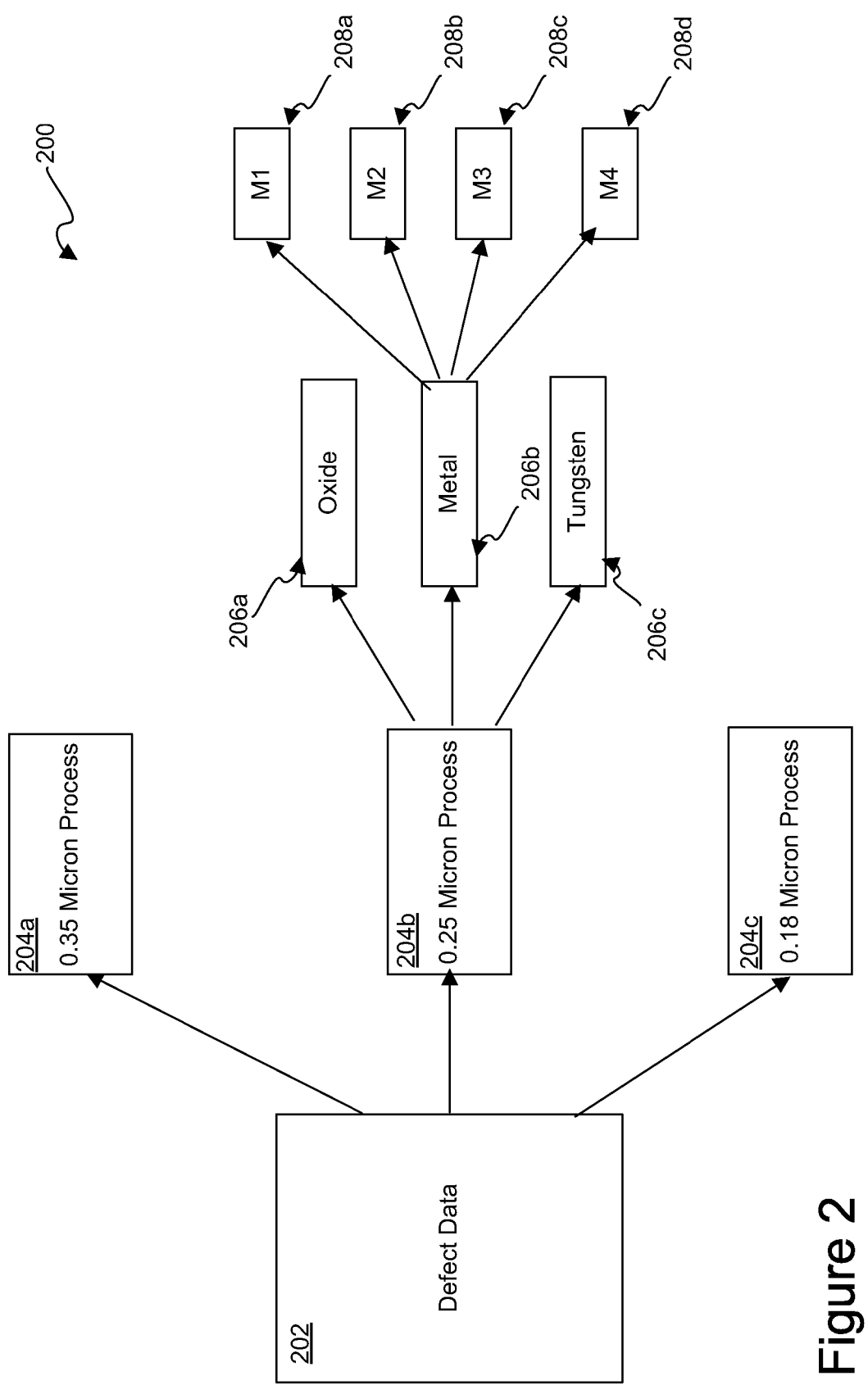
FIG. 2 illustrates one example technique for sorting the defect data into identifying data groups in accordance with one embodiment of the present invention.

The defect data may be sorted into any suitable number and type of identifying data groups (e.g., in operation 106). This sorting may also be user selectable. FIG. 2 illustrates one example technique 200 for sorting the defect data into identifying data groups. For example, the defect data 202 may be sorted into a plurality of process groups 204. As shown, the defect data is divided into a 0.35 micron process group 204a, a 0.25 micron process group 204b, and a 0.18 micron process group 204c. Each of these process groups may then be subdivided into any number and type of groups. For example, each process group 204 is divided into a plurality of layer groups 206. As shown, the 0.25 micron process group includes an oxide layer group 206a, a metal layer group 206b, and a tungsten layer group 206c. Each layer group may also be divided into a plurality of specific levels. As shown, the metal group 206b includes a metal1 208a, metal2 208b, metal3 208c, and metal4 208d group. In another implementation, the defect data is grouped, in order, by fabrication identifier, layer, lot identifier, and wafer identifier.

Each identifying data group may then be sorted into bins based on the defect images' appearance in any suitable manor. FIGS. 3 through 6 illustrate a natural grouping procedure in accordance with one embodiment of the present invention. In general terms, the defect images of a particular identifying data group are arranged into bins having a similar appearance. Each bin may also be associated with one or more bins that have similar defect images. For simplicity, the natural grouping procedure will be illustrated using a feature vector having two dimensions. Of course, each feature vector will typically have a significantly higher number of data points. In the latter case, the illustrated natural grouping procedure is applied across a N number of data points of each feature vector.

Figure 3:
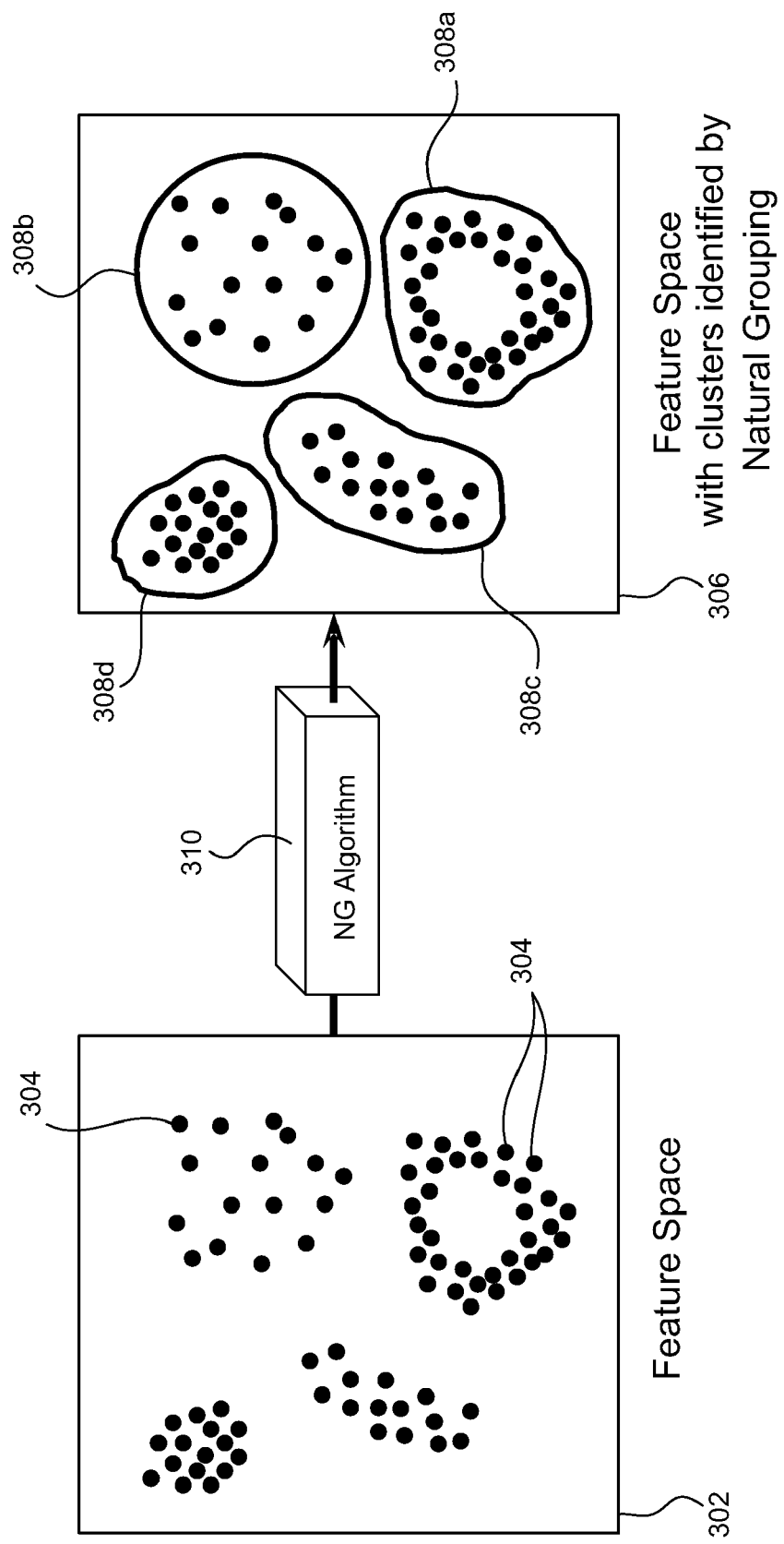
FIG. 3 illustrates two 2-dimensional features spaces in which the feature vector of each defect image of a particular identifying data group is plotted in accordance with one embodiment of the present invention.

FIG. 3 illustrates two 2-dimensional features spaces 302 and 306 in which the feature vector of each defect image of a particular identifying data group is plotted in accordance with one embodiment of the present invention. As shown, a plurality of defect feature vectors 304 are represented within the two dimensional feature space 302. A natural grouping algorithm 310 is then applied to the feature vectors 304 of feature space 302 to generate a feature space 306 having a plurality of groups 308. In effect, the defect data 304 is sorted into a plurality of groups (e.g., groups 308a through 308d).

Figure 4:
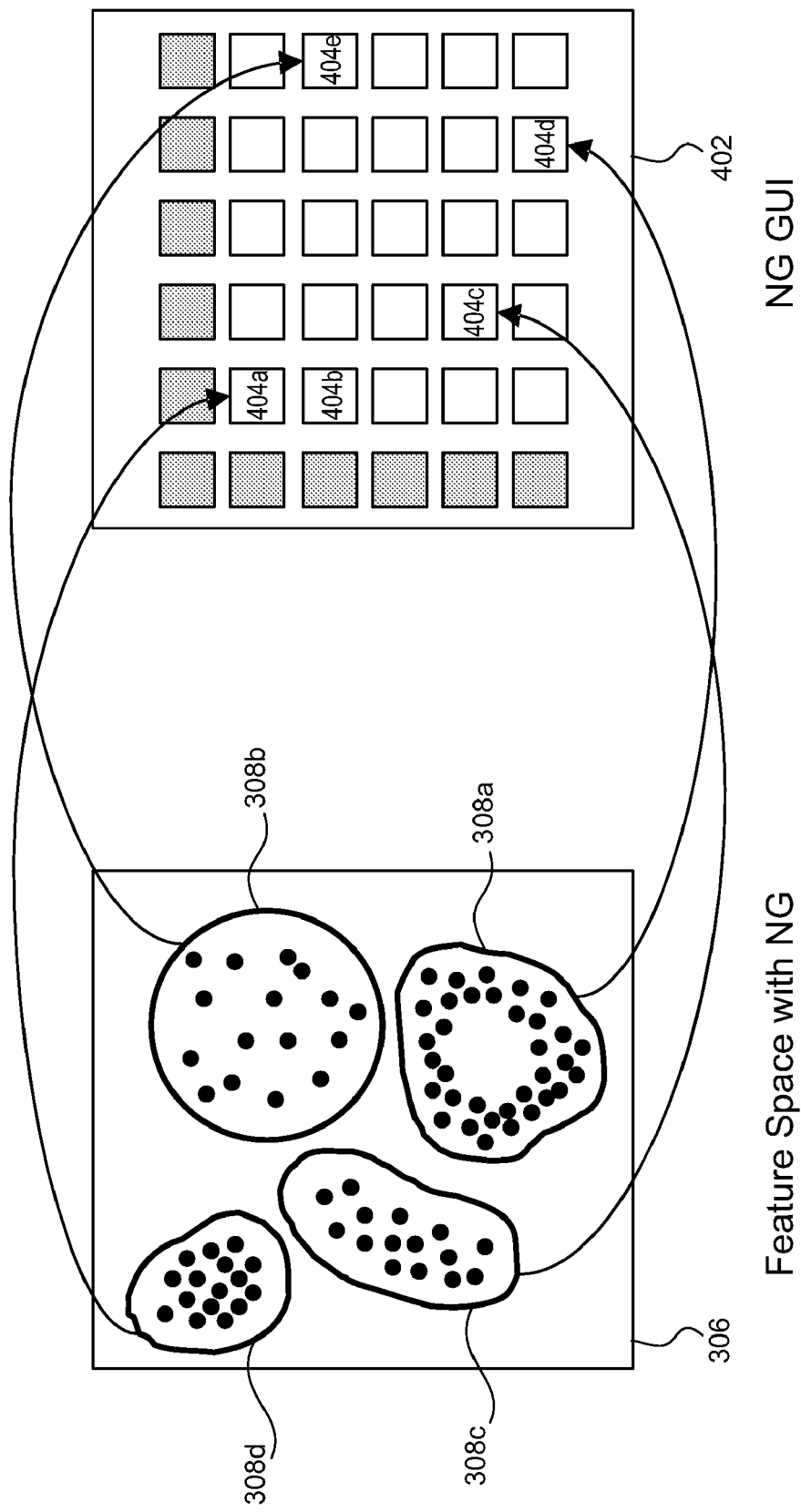
FIG. 4 illustrate a natural grouping process for sorting the feature space of FIG. 3 into a plurality of bins.

As shown in FIG. 4, the groups 308 of feature space 306 are then associated with a plurality of bins 404. In one implementation, the output of the grouping process is a 2D matrix where similar feature vectors are grouped into bins and related bins are placed next to each other. For example, a Kehonen type mapping technique, which technique is well known to those skilled in the art, may be used to group the defect images into any number of bins.

The bins may also be displayed within a natural grouping graphical user interface (GUI) 402 so that a user may view the different bin groups and their associated defect data. The size of each matrix may be user selectable so that a user may optimize the grouping of the defect data into bins. The size selection of the defect group matrix or map may depend on the number of defects and desired granularity of each bin.

Figure 5A:
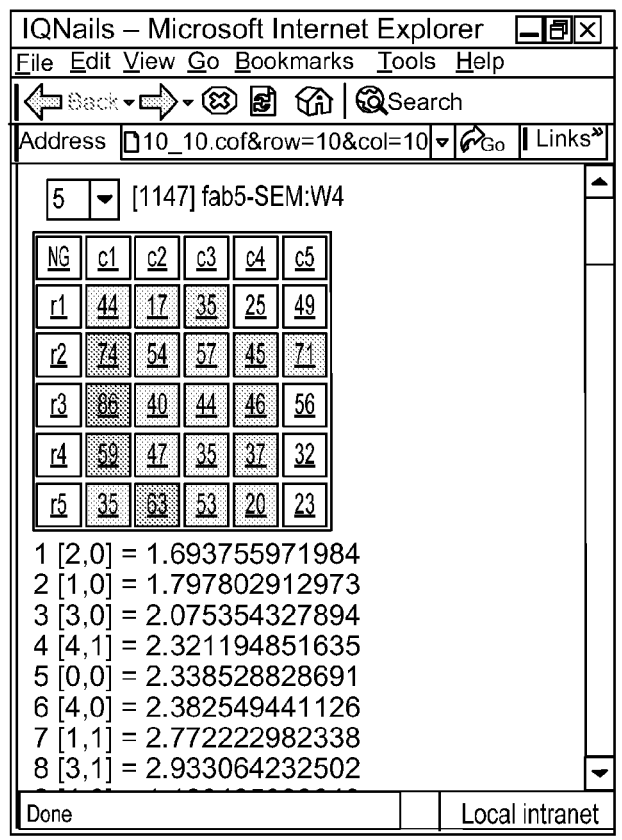
Figure 5B:
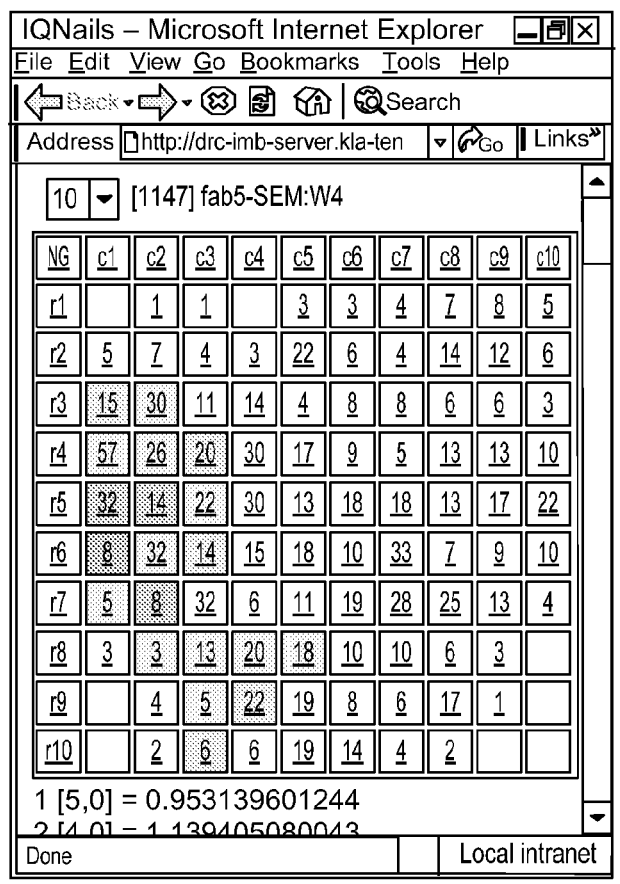
Figure 5C:
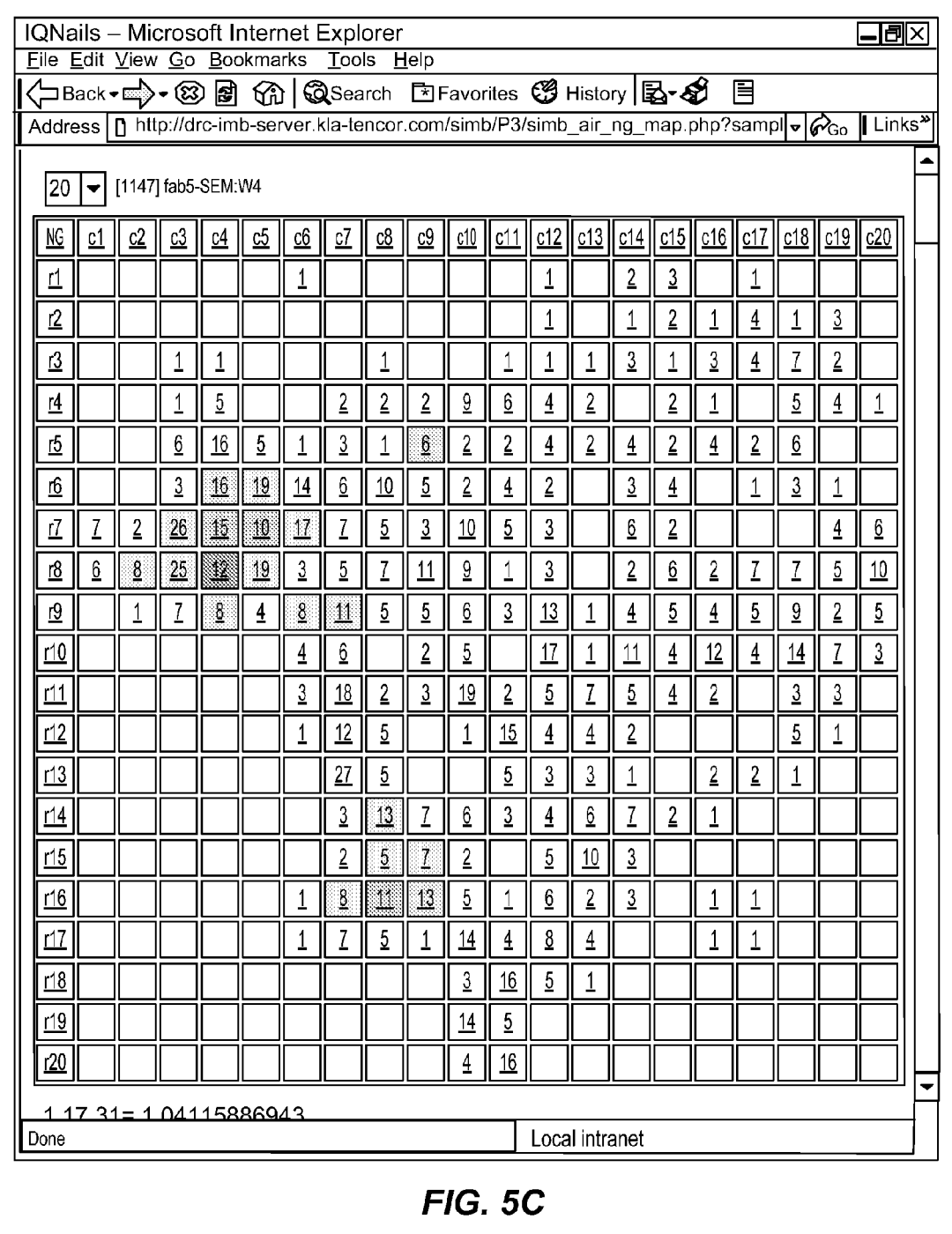

FIGS. 5A through 5C show screenshots of differently sized bin arrangements in accordance with one embodiment of the present invention. FIG. 5A illustrates a 5×5 matrix of bins into which a plurality of defect images have been sorted. As shown, when a 5×5 sized array is selected, the defect data is sorted into twenty-five bins. For example, forty-four defect images belong to the first column (C1) and first row R1 bin. Seventeen defect images belong to the second column (C2) and first row (R1) bin. FIG. 5B illustrates a 10×10 array of bins into which a plurality of defect images have been sorted in accordance with one embodiment of the present invention. As shown, the defect data is distributed among 100 bins. For example, there are zero defect images in the column one (C1) and row one (R1) bin. Likewise, there is only one defect image in the column two (C2) and row one (R1) bin. FIG. 5C illustrates a 20×20 array of bins into which a plurality of defect images have been sorted. As shown, there are 26 defect images in the row seven (R7) and column three (C3) bin.

Figure 8:
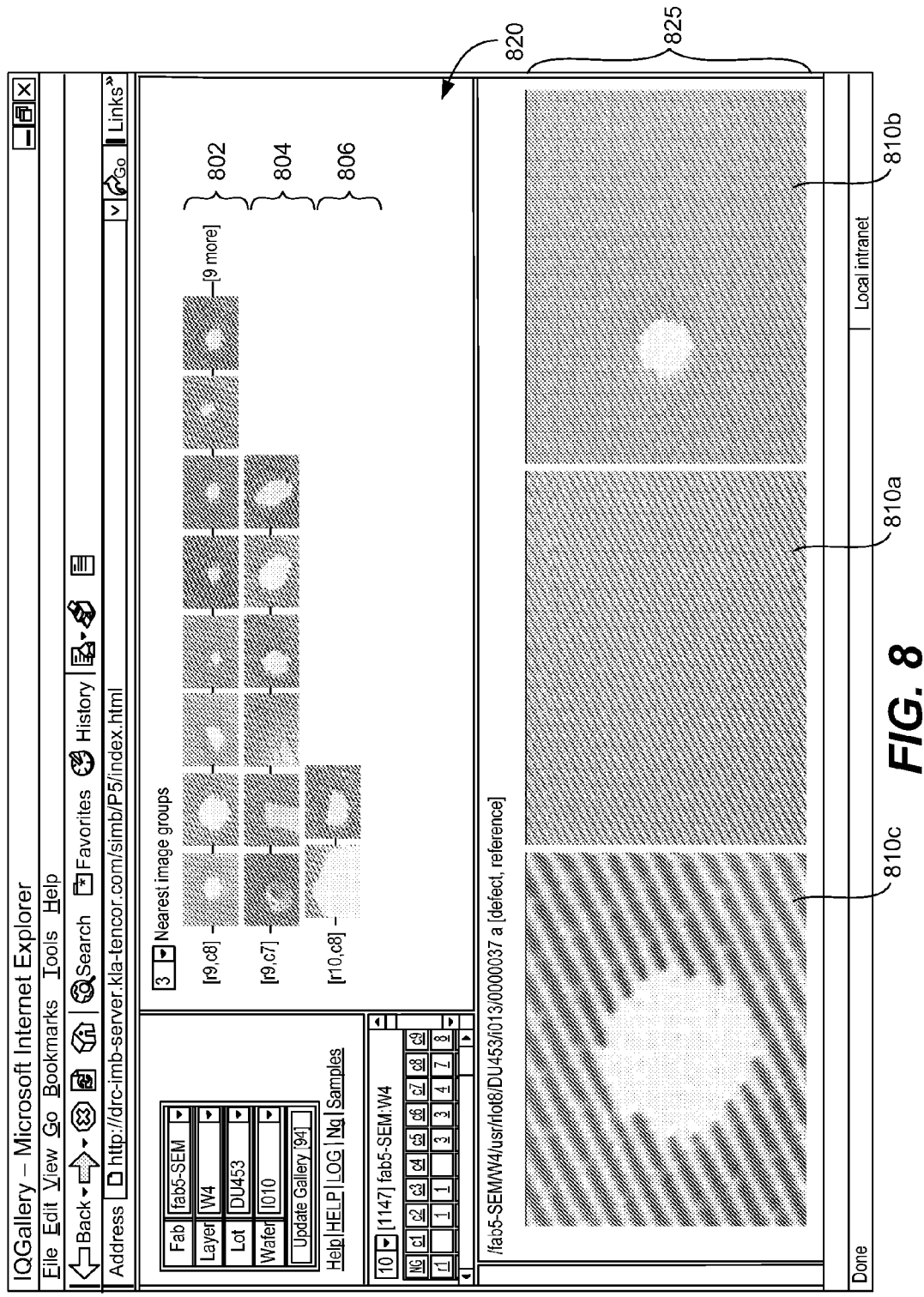
FIG. 8 illustrates a query result in accordance with one embodiment of the present invention.

A user may select the size of the array so that each bin contains defect images that have a similar appearance. In one embodiment, the user may select a particular row and column of the array and view the defect images within such bin to determine whether the defect images of such bin have a similar appearance. Referring briefly to FIG. 8, the defect images for the row 9 column 8 bin are illustrated. If the images do not have a similar appearance, the user may select a larger sized array. Conversely, if two bins have defect images that have the same general appearance, the user may select a smaller sized array so that each bin contains images with different appearances.

The growth in each bin may also be automatically or manually monitored for various purposes. For example, rapid growth in a particular bin can trigger an alarm so that a user can investigate. In one application, if the size of defects are rapidly increasing over a period of time, the user may investigate the cause of such defect size increase.

Figure 6:
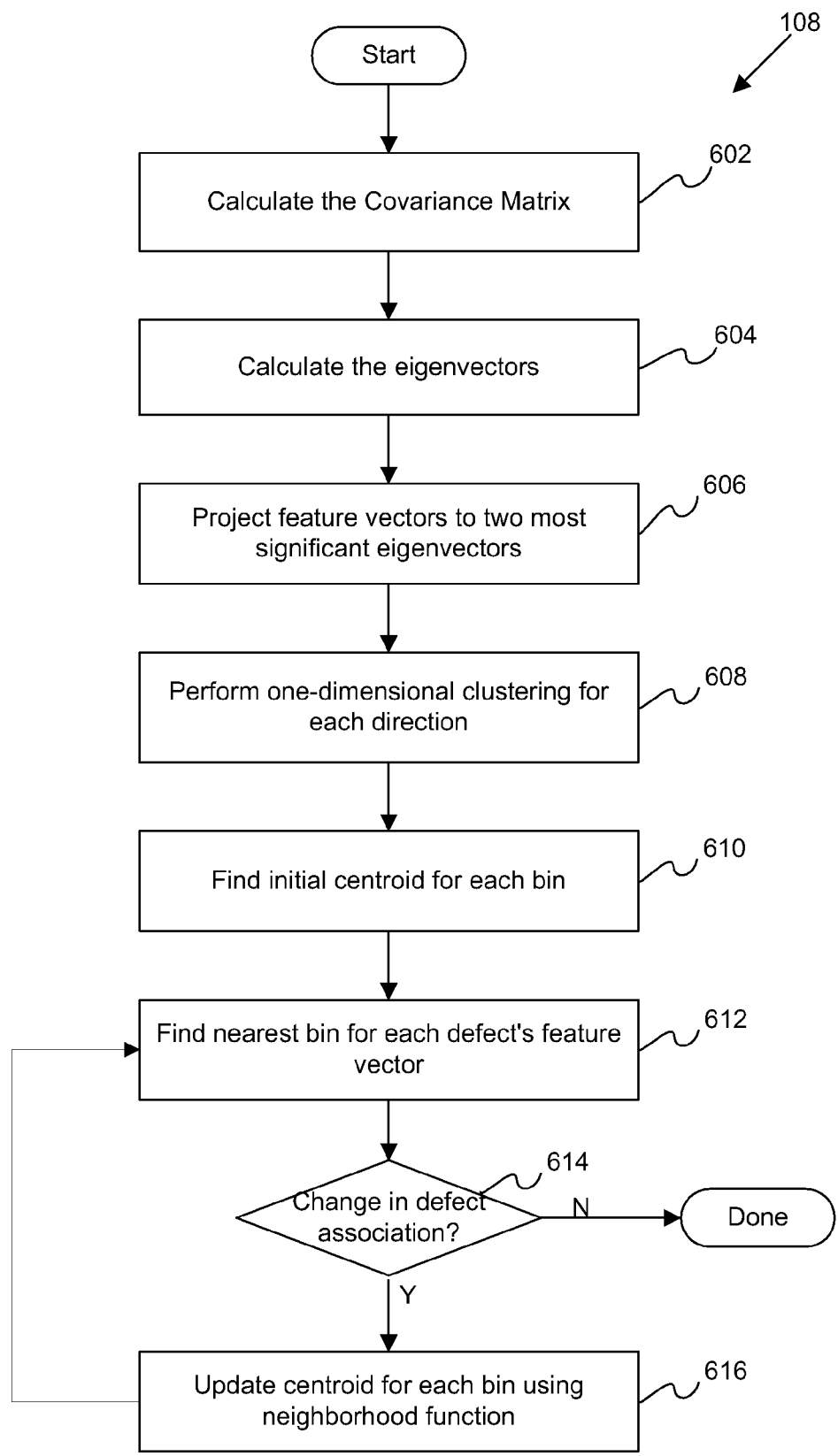
FIG. 6 is a flowchart illustrating a natural grouping algorithm in accordance with one embodiment of the present invention.

Preferably, a stable statistical grouping technique is used to sort the defects into bins. That is, a user of the grouping technique preferably always gets the same map, given the same initial conditions and feature vectors. FIG. 6 is a flowchart illustrating a natural grouping algorithm 108 in accordance with one embodiment of the present invention. Initially, a covariance matrix is calculated in operation 602. The covariance matrix C can be calculated given a set of feature vectors using the following equation 1:

$$C_{ij} = \sum_{k=0}^{N} (A_i^k - m_i)(A_j^k - m_j) \quad [1]$$

where, $C_{ij}$ is the covariance matrix element (i,j).

$A_i$ is the $i^{th}$ element of the feature vector A.

k is the feature vector index.

$m_i$ is the mean of the $i^{th}$ feature vector element.

The eigenvectors for such matrix are then calculated in operation 604. The eigenvectors may be calculated using singular value decomposition since it is a symmetric and non-negative definite matrix (e.g., equation 2).

$$Cw = \lambda w \quad [2]$$

where w is the eigenvector and $\lambda$ is the corresponding eigenvalue.

The feature vectors are then projected to the two most significant eigenvectors vectors in operation 606. That is, a course clustering is initially performed on the two feature vector directions that have the highest variance. This approach is based on the assumption that the direction of highest variance of the feature vectors is the direction in which they are most likely to display clustering tendencies. However, this assumption is not valid if there are too many noisy features. The projections may be calculated using the following equations 3:

$$P_0^k = A^k \cdot w_0$$

$$P_1^k = A^k \cdot w_1 \quad [3]$$

where $w_0$ and $w_1$ denote eigenvectors corresponding to the first and second largest eigenvectors, and $P_0$ and $P_1$ are the projections of feature vector A along the vector $w_0$ and $w_1$.

A one dimensional clustering is then performed for each direction (i.e., along each eigen vector direction $w_0$ and $w_1$) in operation 608. The following equation 4 may be used to perform this one dimensional clustering:

$$\sum_{i=1}^{K} p_i \sigma_i^2 \quad [4]$$

where, $p_i$ is the proportional count and $\sigma_i$ is the standard deviation of the $i^{th}$ cluster.

An initial centroid is then found for each bin in operation 610. In this operation, each feature vector is associated with one of the clustered bins defined by the clustering algorithm described above. Each centroid vector S for each bin may be calculated as a mean of the vectors in each bin with the following equation 5:

$$S = \frac{1}{m} \sum_{k=1}^{m} A \quad [5]$$

The nearest bin is then found for each defect feature vector in operation 612. This is an iterative process. It is then determined whether any defect associations have changed in operation 614. For example, have any defect image's association moved from a first bin to a second bin. Also, the first association of such defect images with their respective bins is defined as a change in association. If there is no change, the natural grouping algorithm 108 ends. However, if there is a defect association change, the centroid for each bin is then updated using a neighborhood function in operation 616. The centroid for each bin may be calculated by averaging all the defect feature vectors in that bin and neighboring bins through a neighborhood function 6:

$$S = \frac{1}{n} \sum_{k=0}^{n} A \otimes H \quad [6]$$

where, S is the updated weighted mean vector for each bin, H is the neighborhood function of the updating bin, and $\otimes$ denotes the Schur product.

Operation 612 and 614 are then repeated, where the nearest bin for each defect feature vector is found and it is determined again whether the defect association has changed for any defect. Operations 612 through 616 are repeated until there is no longer a change in defect association.

Figure 7:
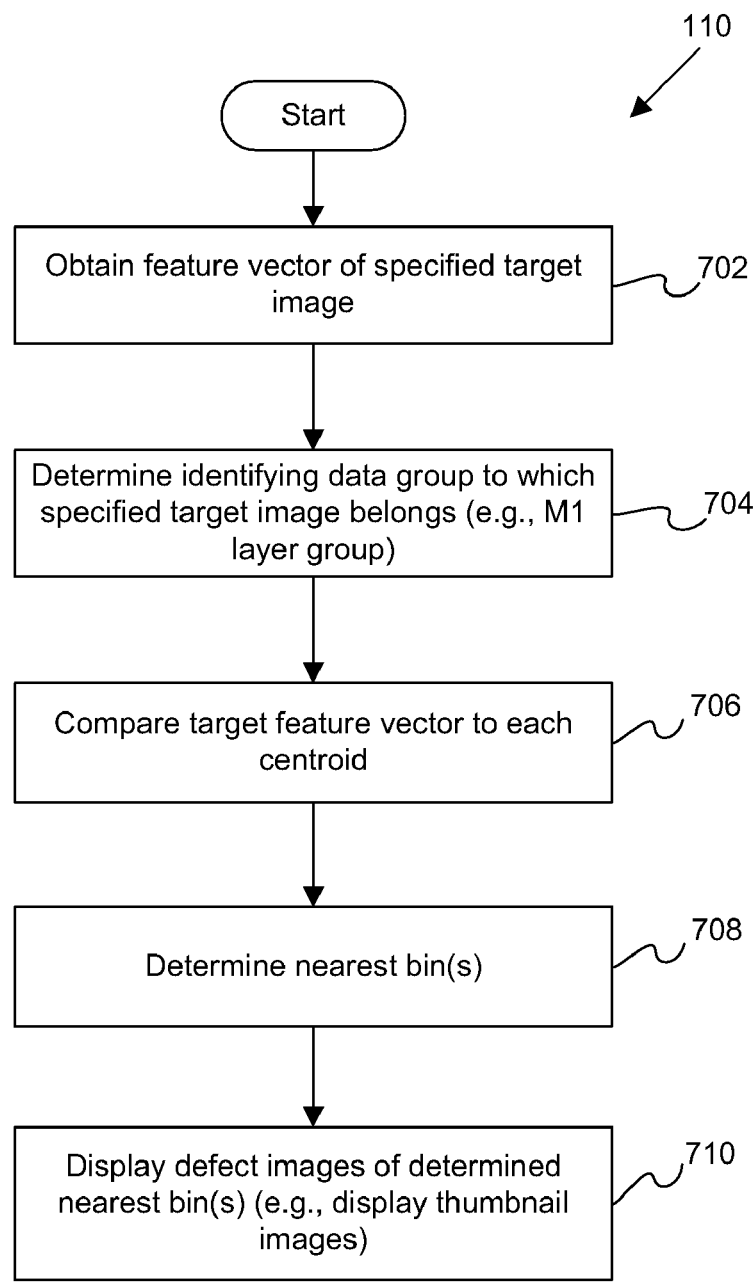
FIG. 7 is a flowchart illustrating the operation of FIG. 1 for searching for one or more images that look like a specified target image in accordance with one embodiment of the present invention.

FIG. 7 is a flowchart illustrating the operation 110 of FIG. 1 for searching for one or more images that look like a specified target image in accordance with one embodiment of the present invention. Initially, a feature vector of the specified target is obtained in operation 702. The target image may have been specified by the user or by any suitable automatic process. It is then determined to which identifying data group the specified target image belongs in operation 704. For example it may be determined that the specified target image belongs to the metal1 group of the 0.25 micron process on wafer #5 of lot #10.

The target feature vector is then compared to each centroid of each bin of the determined identifying data group in operation 706. That is, the target image's vector is compared to each bin's centroid vector. If the feature space is a 5×5 matrix, only 25 centroid vectors need to be compared. The one or more bin(s) that nearest to the specified target are then determined in operation 708. In other words, it is determined which bins have the closest appearance to the target image. In one embodiment, the user may specify the number of nearest neighbors. Any suitable technique may be used to determine which bin(s) have the closest appearance to the target image. Several techniques for finding a nearest group of defect images are described in the above referenced U.S. Patent by Ke Han. The defect images for each of the determined nearest bin(s) are then displayed in operation 710. For example, thumbnail images for each nearest bin are displayed.

FIG. 8 illustrates a query result in accordance with one embodiment of the present invention. As shown, a plurality of thumbnail images for three nearest bins 802, 804, and 806 are displayed in window 820. In one implementation, the user may select a particular defect image within a bin and have the selected defect image displayed at multiple magnification levels. As shown, the user has selected defect image 815 from bin 802. A high level magnification image 810c, a low level magnification image 810b, and a reference image 810a are displayed in window 825.

Figure 9:
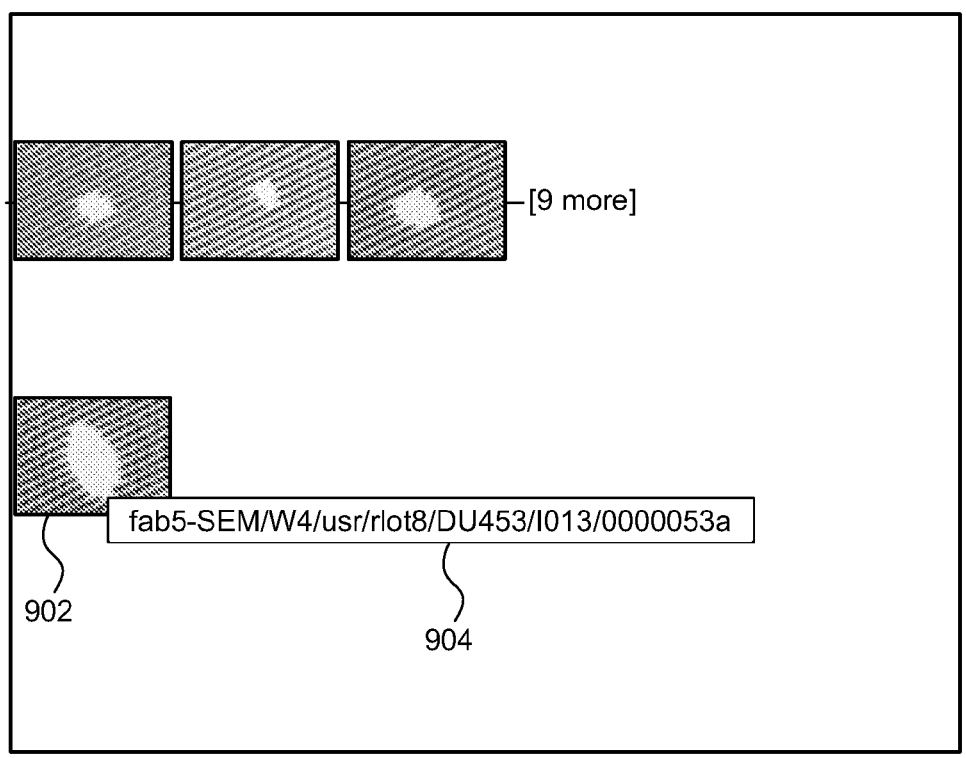
FIG. 9 is a screen shot illustrating defect images and associated identifying data in accordance with one embodiment of the present invention.

In one specific implementation, the identifying data associated with each defect image may also be quickly viewed by the user. FIG. 9 is a screen shot illustrating defect images and associated identifying data in accordance with one embodiment of the present invention. As shown, defect image 902 includes identifying data 904. The identifying data 904 is displayed when the user moves a selection device, such as a mouse, over the defect image 902. Of course, the identifying data may be displayed in any suitable manner. For example, the identifying data may be displayed by clicking or selecting a particular defect image. Alternatively, the identifying data may be constantly displayed along with the query results (e.g., thumbnail images and/or different magnification level images).

The query results may be analyzed in any suitable manner. For example, one may analyze the resulting defect images and their associated identifying data to determine root cause conditions for the target defect. The identifying data of the resulting defect images may be correlated to determine commonalties. For example, the resulting defect images may share the same processing tool which is determined to be the cause of the target defect type. In this case, the processing tool may be defective or out of specification. It may be determined that any number and type of conditions are the cause of a particular defect type. For example, it may be determined that the defect is caused by a drift in the focus of a stepper tool and an inadequate etching rate from the etching processing tool. The search results may also be analyzed to determine the timing of a particular defect type or to find the effect of the defect type on yield. In the later case, the defect types are correlated with yield results (e.g., from the identifying data) to determine whether particular defect types adversely or beneficially affect yield. In another implementation, the query results may be used to adjust the defect capture tool's operating conditions so that the number of defects of a particular type are adjusted (e.g., to a maximum capture number). By way of example, the operating conditions of the tool that is used to inspect and capture a particular type of defect images are adjusted until a predefined number of such defect type is captured. The operating conditions may include the scanning area, landing energy, beam current density, and/or scan pattern of a scanning electron microscope or the polarization setting of the laser, focus, sensitivity, or pixel size of an optical inspection system.

Figure 10:
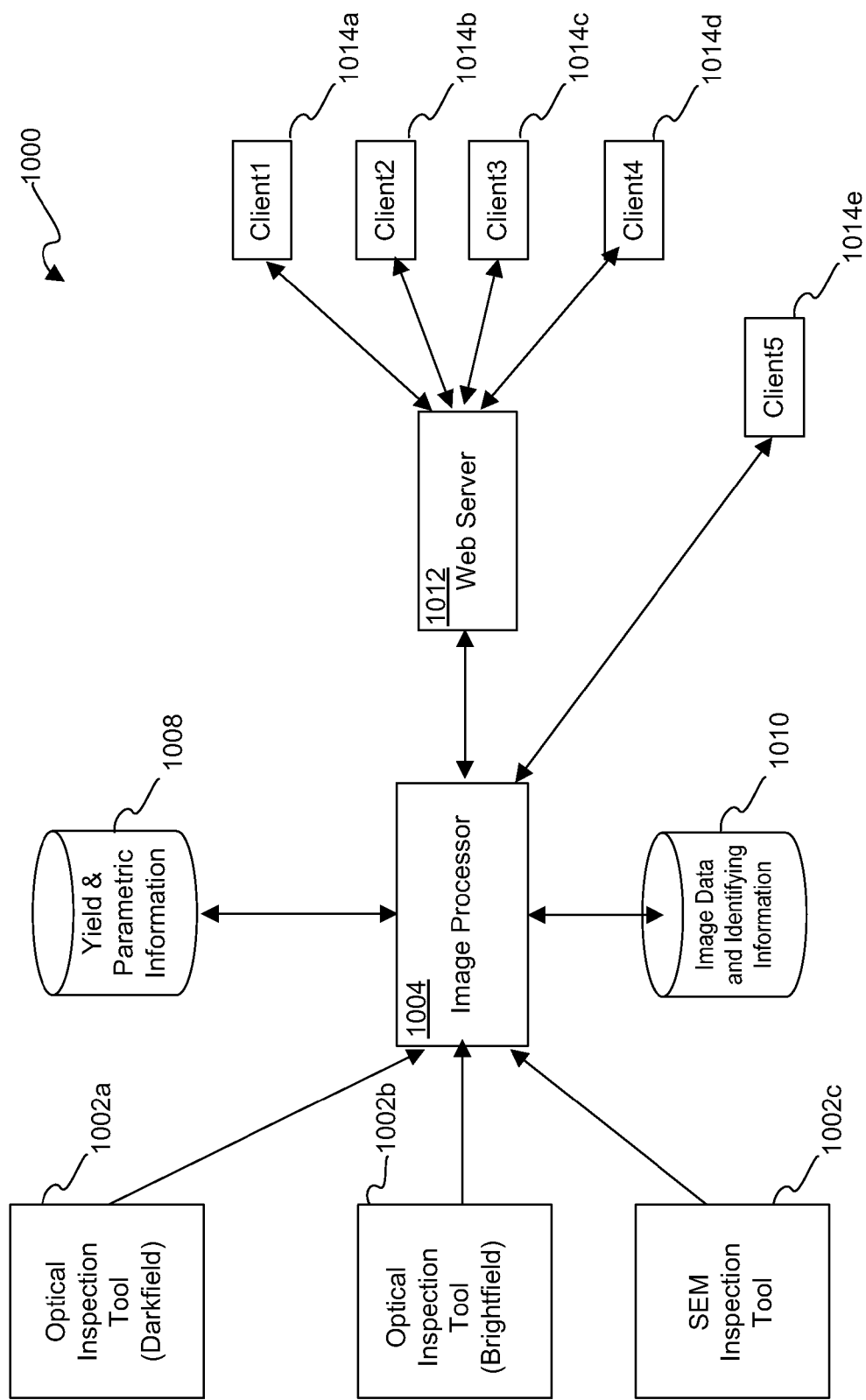
FIG. 10 is a diagrammatic representation of a defect image analysis system in accordance with one embodiment of the present invention.

FIG. 10 is a diagrammatic representation of a defect image processing and analysis system 1000 in accordance with one embodiment of the present invention. As shown, the system 1000 includes a plurality of inspection and/or review systems 1002. Each inspection system is configured to output defect images along with accompanying identifying data to image processor 1004. In one embodiment, the identifying data is formatted in KLARF files (e.g., KLA-Tencor, Inc. results files) which each contains lot identifiers, the number of defects, each defect's location, etc. The defect images along with identifying data are stored in database 1010.

The inspection systems may include any suitable inspection or review tool that is configured for capturing defect images. Each inspection and/or review tool 1002 can also presort images (e.g., into identifying data groups) prior to sending the images to the image processor for further combining and sorting. In the illustrated embodiment, the image processor is configured to implement the above described techniques of the present invention. However, the techniques of the present invention may be implemented in any number and type of data processing devices. That is, the techniques of the present invention may be implemented in any suitable combination of hardware and/or software.

Other useful information that may be associated with the defect images may also be available to the image processor 1004. For example, yield and parametric information may be available in database 1008. Of course, this information may be combined with the other identifying information of database 1010. In sum, the identifying information may be contained within a single database or distributed among a plurality of databases.

A plurality of clients 1014 may access the defect data and/or perform queries through web server 1012. Alternatively or additionally, a client (e.g., 1014e) may perform a query for an image or access a particular image through the image processor 1004 without going through a web server. That is, the techniques performed by the image processor 1004 may be accessed remotely or locally. Additionally, the system 1000 does not have to be web based. Each client may be configured so that a user may initiate a query and view the results of such query. Alternatively, a query may be automatically initiated by a software program or hardware tool. A client may be located in the same fabrication facility in which the image processor and/or databases are located or in a different fabrication facility. In one application of the present invention, a user may wish to start up a particular fabrication facility and use a similar fabrication facility's database of defect images until their own database is built up.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method of organizing and/or analyzing a plurality of defect images having associated identifying data, the method comprising:

automatically sorting the defect images into a plurality of identifying data groups based on at least a portion of the associated identifying data, wherein the automatic sorting of the defect images into identifying data groups is performed without using a training set of manually classified images having classification definitions that were selected by a human and without associating a classification definition with each identifying data group;

associating a feature vector with each defect image; and automatically sorting the defect images of each identifying data group into a plurality of bins based on the associated feature vectors, wherein the automatic sorting of the defect images into bins is performed without using a training set of manually classified images having classification definitions that were selected by a human and without associating a classification definition with each bin.

2. A method as recited in claim 1, wherein the classification definitions are in the form of a plurality of predefined classification codes.

3. A method as recited in claim 1, wherein the defect images are sorted into bins in a single operation without any additional presorting operation based on appearance being performed on the defect images.

4. A method as recited in claim 1, wherein the identifying data includes a process type, a layer type, and a layer level upon which the sorting defect images into identifying data groups is based.

5. A method as recited in claim 4, wherein the identifying data further includes information that is relevant for determining a defect's cause and upon which the sorting defect images into identifying data groups is not based.

6. A method as recited in claim 1, further comprising:
monitoring a growth rate for each bin; and
when a particular bin has a growth rate that is significantly higher than the other bins, triggering an alarm that indicates that the particular bin has a significantly higher growth rate.

7. A method as recited in claim 1, further comprising associating a centroid with each bin, the centroid representing the feature vectors of the defect images within the each bin.

8. A method as recited in claim 7, wherein each centroid of each bin represents an average or mean of all feature vectors within the each bin.

9. A method as recited in claim 7, further comprising:
finding one or more defect images which have a same appearance as a target defect image; and
analyzing the one or more defect images which have a same appearance as a target image and their associated identifying data to determine a cause of the target defect image.

10. A method as recited in claim 9, wherein the one or more defect images which have a same appearance as a target defect image are found by finding one or more centroids which most closely match the target defect image's feature vector.

11. A method as recited in claim 10, wherein the one or more defect images which have a same appearance as a target defect image are from the bins which have an associated centroid which most closely matches the target defect image's feature vector.

12. A method as recited in claim 9, wherein the identifying data is selected from a group consisting of a lot identifier, a wafer identifier, a device identifier, one or more process equipment identifiers, one or more operating parameters for each of the one or more identified process equipment, one or more operator identifiers for each of the one or more identified process equipment, identification of where each of the one or more identified process equipment are in their maintenance cycle, and a fabrication facility identifier.

13. A method as recited in claim 11, further comprising determining a cause of the target defect image by correlating the identifying data associated with the one or more defect images which have a same appearance as the target defect image.

14. A method as recited in claim 11, wherein the identifying data includes yield information and the method further comprising determining how the target defect image affects yield by analyzing the yield information associated with the one or more defect images which have a same appearance as the target defect image.

15. A method as recited in claim 11, further comprising adjusting a setup of an inspection or review tool that was used to acquire the one or more defect images which have a same appearance as the target defect image when a number of the one or more defect images which have a same appearance as the target defect image is not within a predetermined range, wherein the adjustment is selected so that the number of defect images having a same appearance as the target defect image is altered to be within the predetermined range.

16. A computer system operable to organize and/or analyze a plurality of defect images having associated identifying data, the computer system comprising:
one or more processors;
one or more memory, wherein at least one of the processors and memory are adapted to:
automatically sort the defect images into a plurality of identifying data groups based on at least a portion of the associated identifying data, wherein the automatic sorting of the defect images into identifying data groups is performed without using a training set of manually classified images having classification definitions that were selected by a human and without associating a classification definition with each identifying data group;
associate a feature vector with each defect image; and
automatically sort the defect images of each identifying data group into a plurality of bins based on the associated feature vectors, wherein the automatic sorting of the defect images into bins is performed without using a training set of manually classified images having classification definitions that were selected by a human and without associating a classification definition with each bin.

17. A computer system as recited in claim 16, wherein the classification definitions are in the form of a plurality of predefined classification codes.

18. A computer system as recited in claim 16, wherein the defect images are sorted into bins in a single operation without any additional presorting operation based on appearance being performed on the defect images.

19. A computer system as recited in claim 16, wherein at least one of the processors and memory are further adapted to:
monitor a growth rate for each bin; and
when a particular bin has a growth rate that is significantly higher than the other bins, trigger an alarm that indicates that the particular bin has a significantly higher growth rate.

20. A computer system as recited in claim 16, wherein at least one of the processors and memory are further adapted to associate a centroid with each bin, the centroid representing the feature vectors of the defect images within the each bin.

21. A computer system as recited in claim 20, wherein each centroid of each bin represents an average or mean of all feature vectors within the each bin.

22. A computer system as recited in claim 20, wherein at least one of the processors and memory are further adapted to:
find one or more defect images which have a same appearance as a target defect image; and
analyze the one or more defect images which have a same appearance as a target image and their associated identifying data to determine a cause of the target defect image.

23. A computer system as recited in claim 22, wherein the one or more defect images which have a same appearance as a target defect image are found by finding one or more centroids which most closely match the target defect image's feature vector.

24. A computer system as recited in claim 23, wherein the one or more defect images which have a same appearance as a target defect image are from the bins which have an associated centroid which most closely matches the target defect image's feature vector.

25. A computer system as recited in claim 22, wherein the identifying data is selected from a group consisting of a lot identifier, a wafer identifier, a device identifier, one or more process equipment identifiers, one or more operating parameters for each of the one or more identified process equipment, one or more operator identifiers for each of the one or more identified process equipment, identification of where each of the one or more identified process equipment are in their maintenance cycle, and a fabrication facility identifier.

26. A computer system as recited in claim 24, wherein at least one of the processors and memory are further adapted to determine a cause of the target defect image by correlating the identifying data associated with the one or more defect images which have a same appearance as the target defect image.

27. A computer system as recited in claim 24, wherein the identifying data includes yield information and wherein at least one of the processors and memory are further adapted to determine how the target defect image affects yield by analyzing the yield information associated with the one or more defect images which have a same appearance as the target defect image.

28. A computer system as recited in claim 24, wherein at least one of the processors and memory are further adapted to adjust a setup of an inspection or review tool that was used to acquire the one or more defect images which have a same appearance as the target defect image when a number of the one or more defect images which have a same appearance as the target defect image is not within a predetermined range, wherein the adjustment is selected so that the number of defect images having a same appearance as the target defect image is altered to be within the predetermined range.

29. A computer program product for organizing and/or analyzing a plurality of defect images having associated identifying data, the computer program product comprising:
at least one computer readable medium;
computer program instructions stored within the at least one computer readable product configured to cause a computer system to:
automatically sort the defect images into a plurality of identifying data groups based on at least a portion of the associated identifying data, wherein the automatic sorting of the defect images into identifying data groups is performed without using a training set of manually classified images having classification definitions that were selected by a human and without associating a classification definition with each identifying data group;
associate a feature vector with each defect image; and
automatically sort the defect images of each identifying data group into a plurality of bins based on the associated feature vectors, wherein the automatic sorting of the defect images into bins is performed without using a training set of manually classified images having classification definitions that were selected by a human and without associating a classification definition with each bin.

30. A computer program product as recited in claim 29, wherein the classification definitions are in the form of a plurality of predefined classification codes.

31. A computer program product as recited in claim 29, wherein the defect images are sorted into bins in a single operation without any additional presorting operation based on appearance being performed on the defect images.

32. A computer program product as recited in claim 29, wherein the computer program instructions are further configured to cause the computer system to:
monitor a growth rate for each bin; and
when a particular bin has a growth rate that is significantly higher than the other bins, trigger an alarm that indicates that the particular bin has a significantly higher growth rate.

33. A computer program product as recited in claim 29, wherein the computer program instructions are further configured to cause the computer system to associate a centroid with each bin, the centroid representing the feature vectors of the defect images within the each bin.

34. A computer program product as recited in claim 33, wherein each centroid of each bin represents an average or mean of all feature vectors within the each bin.

35. A computer program product as recited in claim 33, wherein at least one of the processors and memory are further adapted to:
find one or more defect images which have a same appearance as a target defect image; and
analyze the one or more defect images which have a same appearance as a target image and their associated identifying data to determine a cause of the target defect image.

36. A computer program product as recited in claim 35, wherein the one or more defect images which have a same appearance as a target defect image are found by finding one or more centroids which most closely match the target defect image's feature vector.

37. A computer program product as recited in claim 36, wherein the one or more defect images which have a same appearance as a target defect image are from the bins which have an associated centroid which most closely matches the target defect image's feature vector.

38. A computer program product as recited in claim 35, wherein the identifying data is selected from a group consisting of a lot identifier, a wafer identifier, a device identifier, one or more process equipment identifiers, one or more operating parameters for each of the one or more identified process equipment, one or more operator identifiers for each of the one or more identified process equipment, identification of where each of the one or more identified process equipment are in their maintenance cycle, and a fabrication facility identifier.

39. A computer program product as recited in claim 37, wherein the computer program instructions are further configured to cause the computer system to determine a cause of the target defect image by correlating the identifying data associated with the one or more defect images which have a same appearance as the target defect image.

40. A computer program product as recited in claim 37, wherein the identifying data includes yield information and wherein the computer program instructions are further configured to cause the computer system to determine how the target defect image affects yield by analyzing the yield information associated with the one or more defect images which have a same appearance as the target defect image.

41. A computer program product as recited in claim 37, wherein the computer program instructions are further configured to cause the computer system to adjust a setup of an inspection or review tool that was used to acquire the one or more defect images which have a same appearance as the target defect image when a number of the one or more defect images which have a same appearance as the target defect image is not within a predetermined range, wherein the adjustment is selected so that the number of defect images having a same appearance as the target defect image is altered to be within the predetermined range.

* * * * *